United States Patent
Yao et al.

(10) Patent No.: US 9,287,922 B1
(45) Date of Patent: Mar. 15, 2016

(54) SPREADING SIGNAL GENERATING METHOD, GENERATING DEVICE, RECEIVING METHOD AND RECEIVING DEVICE

(71) Applicant: Tsinghua University, Beijing (CN)

(72) Inventors: Zheng Yao, Beijing (CN); Mingquan Lu, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 14/817,391

(22) Filed: Aug. 4, 2015

Related U.S. Application Data (63) Continuation of application No. 14/436,456, filed as application No. PCT/CN2014/093023 on Dec. 4, 2014.

(30) Foreign Application Priority Data

Dec. 6, 2013 (CN) .......................... 2013 1 0655408

(51) Int. Cl.
*H04B 1/00* (2006.01)
*H04B 1/7075* (2011.01)

(52) U.S. Cl.
CPC .................................. *H04B 1/7075* (2013.01)

(58) Field of Classification Search
CPC .............................. H04B 1/707; H04L 5/0021
See application file for complete search history.

(56) References Cited

U.S. PATENT DOCUMENTS

| | | | | |
|---|---|---|---|---|
| 5,742,636 A | * | 4/1998 | Fukushi | H04B 1/707 370/311 |
| 6,266,362 B1 | * | 7/2001 | Tuttle | G06K 7/0008 375/141 |
| 2007/0024375 A1 | * | 2/2007 | Yamamoto | H03F 1/32 303/302 |
| 2008/0253433 A1 | * | 10/2008 | Djuknic | G01S 19/02 375/146 |

* cited by examiner

*Primary Examiner* — Shuwang Liu
*Assistant Examiner* — Gina Mckie
(74) *Attorney, Agent, or Firm* — Hamilton, DeSanctis & Cha (57) ABSTRACT

The application relates to a spreading signal generating method, generating device, receiving method and receiving device. The spreading signal generating method comprises: generating a first spreading signal component and a second spreading signal component, wherein the first spreading signal component and the second spreading signal component each comprise a spreading code and a binary subcarrier, the spreading code of the first spreading signal component is the same as the spreading code of the second spreading signal component, the binary subcarrier of the first spreading signal component is different from the binary subcarrier of the second spreading signal component; and modulating the first spreading signal component and the second spreading signal component with radio frequency (RF) carriers so as to generate the spreading signal, where a phase of RF carrier for modulating the first spreading signal component is different from a phase of RF carrier for modulating the second spreading signal component.

9 Claims, 3 Drawing Sheets

SPREADING SIGNAL GENERATING METHOD, GENERATING DEVICE, RECEIVING METHOD AND RECEIVING DEVICE

CROSS REFERENCE TO RELATED APPLICATION

The present application claims priority to (is a continuation of) U.S. patent application Ser. No. 14/436,456 filed Apr. 16, 2015 entitled "Spreading Signal Generating Method, Generating Device, Receiving Method And Receiving Device"; which in turn claims priority to (is a US National Stage Filing of) PCT Application No. PCT/CN2014/093023 filed Dec. 4, 2014 entitled "Spreading Signal Generating Method, Generating Device, Receiving Method and Receiving Device". The aforementioned PCT application claims priority to Chinese Patent Application No. 201310655408.8 filed Dec. 6, 2013. The entirety of each of the three aforementioned references is incorporated herein by reference for all purposes.

TECHNICAL FIELD

The application relates to the field of spreading signal generating method, generating device, receiving method and receiving device.

BACKGROUND OF THE INVENTION

Direct Sequence Spread Spectrum (DSSS) technique has widely used in the signal of Global Navigation Satellite System (GNSS), in order to enable accurate ranging through using the frequent phase reversal of spreading code and to achieve the good performance in multiple access, and that in anti-multipath and anti-interference. It has been found that sharing the limited frequency band of GNSS among various GNSS signals is difficult. Hence, there exists a need in the are for advanced approaches.

BRIEF SUMMARY OF THE INVENTION

The application relates to the field of spreading signal generating method, generating device, receiving method and receiving device.

Some embodiments of the present invention provide a spreading signal generating method is disclosed, which includes: generating a first spreading signal component and a second spreading signal component, wherein the first spreading signal component and the second spreading signal component each comprise a spreading code and a binary subcarrier, the spreading code of the first spreading signal component is the same as the spreading code of the second spreading signal component, the binary subcarrier of the first spreading signal component is different from the binary subcarrier of the second spreading signal component; and modulating the first spreading signal component and the second spreading signal component with radio frequency (RF) carriers so as to generate the spreading signal, wherein a phase of RF carrier for modulating the first spreading signal component is different from a phase of RF carrier for modulating the second spreading signal component, and the spreading signal generated is:

$$S_{RF} = S_1 \cdot \cos(\omega_{RF} t) + S_2 \cdot \cos(\omega_{RF} t + \theta)$$

$$S_1 = A_1 \cdot c(t) \cdot q_1(t) \cdot d(t)$$

$$S_2 = A_2 \cdot c(t) \cdot q_2(t) \cdot d(t),$$

where $S_{RF}$ stands for the spreading signal, $S_1$ and $S_2$ stand for the first spreading signal component and the second spreading signal component respectively, $A_1$ and $A_2$ stand for an amplitude of $S_1$ and an amplitude of $S_2$ respectively, $c(t)$ stands for the spreading code of $S_1$ and $S_2$, $q_1(t)$ and $q_2(t)$ stand for the binary subcarrier of $S_1$ and the binary subcarrier of $S_2$, $d(t)$ stands for a data message, $\omega_{RF}$ stands for an angular frequency of RF carrier, and $\theta$ stands for a phase difference between the phase of RF carrier for modulating $S_1$ and the phase of RF carrier for modulating $S_2$.

DETAILED DESCRIPTION

Hereinafter, with reference to the appended drawings, a detailed description on the spreading signal generating method, generating device, receiving method and receiving device disclosed in the application will be presented. For simplicity, in the description of the embodiments of the present application, the same or similar reference numeral is used for the same or similar device.

It has been determined that sharing a limited frequency band of GNSS among various GNSS signals while improving the ranging accuracy and anti-interference performance of signals, it is useful to use new signal modulation techniques. Binary Offset Carrier (BOC) modulation is one of such examples, where a signal is multiplied by a square-wave subcarrier based on the DSSS modulation of rectangular non-return-to-zero spreading code chip. In general, BOC modulation has two parameters: a subcarrier rate $f_s$ and a spreading sequence rate $f_c$, where $f_s \geq f_c$. Therefore, a specific BOC modulation can be denoted via $BOC(f_s, f_c)$. In the context of GNSS, a more simple notation is BOC(m,n), where $f_s$ and $f_c$ are normalized with 1.023 MHz, that is, $m = f_s/1.023$ MHz and $n = f_c/1.023$ MHz. In addition, there emerge various multiplexed BOC modulation techniques, such as Time-Multiplexed Binary Offset Carrier (TMBOC) modulation, and Composite Binary Offset Carrier (CBOC) modulation.

Some embodiments of the present inventions provide a spreading signal generating method, generating device, receiving method and receiving device.

In some instances of the aforementioned embodiments, a spreading signal generating method is disclosed, which comprises: generating a first spreading signal component and a second spreading signal component, wherein the first spreading signal component and the second spreading signal component each comprise a spreading code and a binary subcarrier, the spreading code of the first spreading signal component is the same as the spreading code of the second spreading signal component, the binary subcarrier of the first spreading signal component is different from the binary subcarrier of the second spreading signal component; and modulating the first spreading signal component and the second spreading signal component with radio frequency (RF) carriers so as to generate the spreading signal, wherein a phase of RF carrier for modulating the first spreading signal component is different from a phase of RF carrier for modulating the second spreading signal component, and the spreading signal generated is:

$$S_{RF}=S_1 \cdot \cos(\omega_{RF}t)+S_2 \cdot \cos(\omega_{RF}t+\theta)$$

$$S_1=A_1 \cdot c(t) \cdot q_1(t) \cdot d(t)$$

$$S_2=A_2 \cdot c(t) \cdot q_2(t) \cdot d(t),$$

where $S_{RF}$ stands for the spreading signal, $S_1$ and $S_2$ stand for the first spreading signal component and the second spreading signal component respectively, $A_1$ and $A_2$ stand for an amplitude of $S_1$ and an amplitude of $S_2$ respectively, $c(t)$ stands for the spreading code of $S_1$ and $S_2$, $q_1(t)$ and $q_2(t)$ stand for the binary subcarrier of $S_1$ and the binary subcarrier of $S_2$, $d(t)$ stands for a data message, $\omega_{RF}$ stands for an angular frequency of RF carrier, and $\theta$ stands for a phase difference between the phase of RF carrier for modulating $S_1$ and the phase of RF carrier for modulating $S_2$.

In various instances of the aforementioned embodiments, a spreading signal generating device is disclosed, which comprises: a spreading signal component generating unit to generate a first spreading signal component and a second spreading signal component, wherein the first spreading signal component and the second spreading signal component each comprises a spreading code and a binary subcarrier, the spreading code of the first spreading signal component is the same as the spreading code of the second spreading signal component, the binary subcarrier of the first spreading signal component is different from the binary subcarrier of the second spreading signal component; and a spreading signal generating unit to modulate the first spreading signal component and the second spreading signal component with RF carriers so as to generate the spreading signal, wherein a phase of RF carrier for modulating the first spreading signal component is different from a phase of RF carrier for modulating the second spreading signal component, and the spreading signal generating unit generates the spreading signal with the following equations:

$$S_{RF}=S_1 \cdot \cos(\omega_{RF}t)+S_2 \cdot \cos(\omega_{RF}t+\theta)$$

$$S_1=A_1 \cdot c(t) \cdot q_1(t) \cdot d(t)$$

$$S_2=A_2 \cdot c(t) \cdot q_2(t) \cdot d(t)$$

where $S_{RF}$ stands for the spreading signal, $S_1$ and $S_2$ stand for the first spreading signal component and the second spreading signal component respectively, $A_1$ and $A_2$ stand for an amplitude of $S_1$ and an amplitude of $S_2$ respectively, $c(t)$ stands for the spreading code of $S_1$ and $S_2$, $q_1(t)$ and $q_2(t)$ stand for the binary subcarrier of $S_1$ and the binary subcarrier of $S_2$ respectively, $d(t)$ stands for a data message, $\omega_{RF}$ stands for an angular frequency of RF carrier, $\theta$ stands for a phase difference between the phase of RF carrier for modulating $S_1$ and the phase of RF carrier for modulating $S_2$.

In one or more instances of the aforementioned embodiments, a method for receiving a spreading signal is disclosed, which comprises: generating a local replica of spreading code of the spreading signal; generating a local replica of binary subcarrier of the first spreading signal component and a local replica of binary subcarrier of the second spreading signal component; generating a local carrier based on a phase difference between a phase of RF carrier for modulating the first spreading signal component and a phase of RF carrier for modulating the second spreading signal component; calculating a coherent integration for the spreading signal received, and calculating a linear combination of results of the integration, based on the local carrier, the local replica of spreading code, the local replica of binary subcarrier of the first spreading signal component and the local replica of binary subcarrier of the second spreading signal component generated, so as to obtain an integrated in-phase channel component and an integrated quadrature-phase channel component.

In some instances of the aforementioned embodiments, a spreading signal receiver is disclosed, which comprises: a baseband signal generating unit to generate a local replica of spreading code of the spreading signal and to generate a local replica of binary subcarrier of a first spreading signal component and a local replica of binary subcarrier of a second spreading signal component; a local carrier generating unit to generate the local carrier based on a phase difference between a phase of RF carrier for modulating the first spreading signal component and a phase of RF carrier for modulating the second spreading signal component; and a calculating unit to calculate a coherent integration for the spreading signal received, and calculating a linear combination of results of the integration, based on the local carrier, the local replica of spreading code, the local replica of binary subcarrier of the first spreading signal component and the local replica of binary subcarrier of the second spreading signal component generated, so as to obtain an integrated in-phase channel component and an integrated quadrature-phase channel component.

Figure 1:
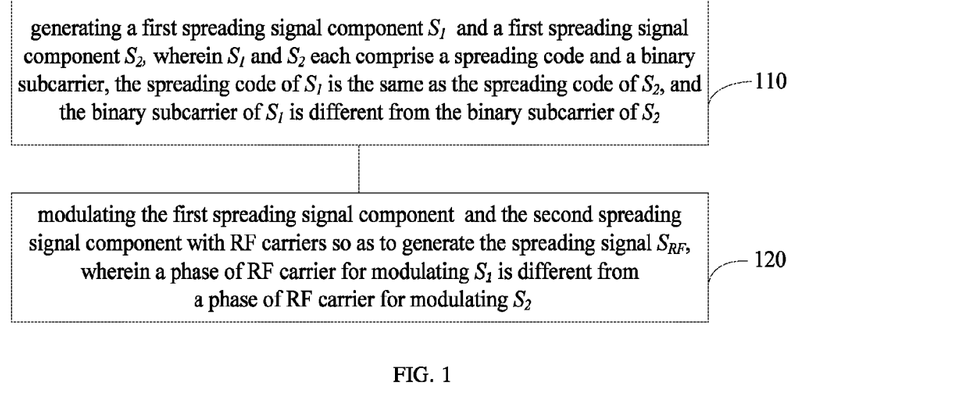
FIG. 1 illustrates a flowchart of a spreading signal generating method according to an embodiment of the present application.

FIG. 1 illustrates a flowchart of a spreading signal generating method for generating a spreading signal $S_{RF}$ according to an embodiment of the present application.

In Step 110, a first spreading signal component $S_1$ and a second spreading signal component $S_2$ are generated, wherein the first spreading signal component $S_1$ and the second spreading signal component $S_2$ each comprise a spreading code and a binary subcarrier. The spreading code of the first spreading signal component $S_1$ is the same as the spreading code of the second spreading signal component $S_2$, and the binary subcarrier of the first spreading signal component $S_1$ is different from the binary subcarrier of the second spreading signal component $S_2$.

In Step 120, the first spreading signal component $S_1$ and the second spreading signal component $S_2$ are modulated with RF carriers so as to generate the spreading signal $S_{RF}$, wherein a phase of RF carrier for modulating the first spreading signal component $S_1$ is different from a phase of RF carrier for modulating the second spreading signal component $S_2$.

The two spreading signal components each comprise the spreading code and the binary subcarrier are modulated with two different carrier phases respectively, enabling the multiplex of spreading signal components.

The spreading signal $S_{RF}$ generated in Step 120 is expressed as:

$$S_{RF}=S_1 \cdot \cos(\omega_{RF}t)+S_2 \cdot \cos(\omega_{RF}t+\theta),$$

where $S_1=A_1 \cdot c(t) \cdot q_1(t) \cdot d(t)$, and $$S_2=A_2 \cdot c(t) \cdot q_2(t) \cdot d(t),$$

wherein $S_1$ and $S_2$ stand for the first spreading signal component and the second spreading signal component respectively, $A_1$ and $A_2$ stand for an amplitude of $S_1$ and an amplitude of $S_2$ respectively, c(t) stands for the spreading code of $S_1$ and $S_2$, $q_1(t)$ and $q_2(t)$ stand for the binary subcarrier of $S_1$ and the binary subcarrier of $S_2$ respectively, d(t) stands for a data message, $\omega_{RF}$ stands for an angular frequency of RF carrier, and θ stands for a phase difference between the phase of RF carrier for modulating $S_1$ and the phase of RF carrier for modulating $S_2$.

According to an embodiment of the present application, the binary subcarrier is a binary coded symbol (BCS) subcarrier. For example, the subcarrier of the first spreading signal component $S_1$ can be BCS([1 1 1 1 -1 1 1 1 1], 1), and the subcarrier of the second spreading signal component $S_2$ can be BCS([1 1 1 1 1 -1 1 1 1 1], 1), among others. As can be appreciated by those skilled in the art, the BCS subcarrier herein is only for exemplary illustration, and the binary subcarrier of spreading signal component can be any form of BCS subcarrier.

According to another embodiment of the present application, the binary subcarrier is a binary offset carrier (BOC) subcarrier, i.e., BOC(m, n), wherein m is the result of the square-wave subcarrier frequency $f_s$ of the BOC component normalized with 1.023 MHz, that is, $m = f_s/1.023$ MHz; n is the result of the spreading code c(t) frequency $f_c$ of the BOC signal normalized with 1.023 MHz. For example, the subcarrier of the first spreading signal component $S_1$ can be BOC(1, 1), and the subcarrier of the second spreading signal component $S_2$ can be BOC(6, 1). As can be appreciated by those skilled in the art, BOC(1, 1) and BOC(6, 1) herein are only for exemplary illustration, and the binary subcarrier of spreading signal component can be any form of BOC subcarrier.

When the binary subcarrier is a BOC subcarrier, the spreading signal components $S_1$ and $S_2$ are BOC signals. As can be appreciated, in this case the two BOC signals are multiplexed. According to the BOC multiplex method of the present embodiment, the two signal components are modulated on different phases of the carrier respectively. With the embodiment, the proportion of an inter-modulation component between two different BOC signal components among the total signal can be flexibly adjusted.

As can be appreciated by those skilled in the art, the acquisition, tracking, demodulation and anti-multipath and other performances of a signal at receiving are in close relation to the spectral characteristics of the signal. With regard to the multiplexed BOC signal of the present embodiment, the acquisition, tracking, demodulation and anti-multipath performances at receiving can be influenced by the amount of the inter-modulation component between the two signal components.

According to an embodiment of the present application, a phase difference θ can be further set so as to adjust the inter-modulation component between the first spreading signal component $S_1$ and the second spreading signal component $S_2$. By means of setting the carrier phase relationship of the two signal components, characteristics of the signal to be transmitted can be adjusted so as to optimize the acquisition, tracking, demodulation and anti-multipath performances at receiving, for satisfying specific requirements.

According to the present embodiment, a baseband signal can be expressed as:

$$S_{BB}(t) = S_1(t) + S_2(t)e^{j\theta}.$$

in this case, the auto-correlation function of the baseband signal is $$R(\tau) = A_1^2 R_1(\tau) + A_2^2 R_2(\tau) + 2A_1 A_2 R_c(\tau)\cos\theta,$$

where $R_1$ and $R_2$ are an auto-correlation function of $c(t)q_1(t)$ and an auto-correlation function of $c(t)q_2(t)$ respectively, and $R_c(\tau)$ is a cross-correlation function of $c(t)q_1(t)$ and $c(t)q_2(t)$. As can be seen, in addition to the auto-correlation function of the first spreading signal component and the auto-correlation function of the second spreading signal component, the cross-correlation function of the first spreading signal component and the second spreading signal component, i.e., the aforementioned inter-modulation component, is also included in the auto-correlation function of the baseband signal.

cos θ can be configured to be any value between −1 and +1 by setting a value of the phase difference θ, such that the amount of the inter-modulation component can be adjusted.

According to an embodiment of the present application, the value of the phase difference θ can be determined based on a demodulation performance index η and a tracking performance index β as required at the receiving of the spreading signal. The demodulation performance index η at the receiving of the spreading signal depicts the power loss of the spreading signal introduced due to the transmitter filtering, which directly influences the correlator output signal to noise ratio (SNR) of the receiver. The tracking performance index β refers to the root mean square (RMS) bandwidth of the spreading signal after the transmitter filtering, which directly influences the tracking loop error under the thermal noise and multipath.

For example, the demodulation performance index η and the tracking performance index β can be expressed as the following equations:

$$\eta(\theta) = \frac{\int_{BW}\int_{-\infty}^{+\infty}(A_1^2 R_1(\tau) + A_2^2 R_2(\tau) + 2A_1 A_2 R_c(\tau)\cos\theta)e^{-j2\pi f\tau}d\tau df}{\int_{-\infty}^{+\infty}\int_{-\infty}^{+\infty}(A_1^2 R_1(\tau) + A_2^2 R_2(\tau) + 2A_1 A_2 R_c(\tau)\cos\theta)e^{-j2\pi f\tau}d\tau df}$$

$$\beta(\theta) = \left(\frac{\int_{BW}f^2\int_{-\infty}^{+\infty}(A_1^2 R_1(\tau) + A_2^2 R_2(\tau) + 2A_1 A_2 R_c(\tau)\cos\theta)e^{-j2\pi f\tau}d\tau df}{\int_{-\infty}^{+\infty}\int_{-\infty}^{+\infty}(A_1^2 R_1(\tau) + A_2^2 R_2(\tau) + 2A_1 A_2 R_c(\tau)\cos\theta)e^{-j2\pi f\tau}d\tau df}\right)^{1/2}$$

where BW is a signal transmitter bandwidth, $n_0$ is a double-sided power spectral density of the white Gaussian noise (GWN), $A_1$ and $A_2$ stand for an amplitude of the first spreading signal component $S_1$ and an amplitude of the second spreading signal component $S_2$ respectively, $R_1$ stands for an auto-correlation function of $c(t)q_1(t)$, $R_2$ stands for an auto-correlation function of $c(t)q_2(t)$, and $R_c(\tau)$ is a cross-correlation function of $c(t)q_1(t)$ and $c(t)q_2(t)$.

According to the requirement of accuracy, by means of traversing all the possible values of the phase difference θ among the $\{\theta_k, k=1, 2, \ldots, N\}$ with a certain step, a set of corresponding demodulation performance indices $\{\eta_k, k=1, 2, \ldots, N\}$ and a set of corresponding tracking performance indices $\{\beta_k, k=1, 2, \ldots, N\}$ can be obtained, wherein the number N of the traversing of the phase difference θ is determined by the required accuracy. As can be understood by those skilled in the art, the anti-multipath performance of signal is related to the tracking performance index β. According to requirement for demodulation performance, tracking performance and anti-multipath performance in the signal design, a pair of tracking performance index and demodulation performance index $(\beta_{k-opt}, \eta_{k-opt})$ can be selected among the $\{\eta_k, k=1, 2, \ldots\}$ and $\{\theta_k, k=1, 2, \ldots\}$ to satisfy the requirements, and then the value of the phase difference θ will be set as $\theta_{k-opt}$.

According to an embodiment of the present application, the phase difference θ can be set as $$\pm \frac{\pi}{2},$$

so as to adjust the inter-modulation component between the first spreading signal component $S_1$ and the second spreading signal component $S_2$ as being zero.

For example, for a BOC subcarrier, when the phase difference θ is $$\pm \frac{\pi}{2},$$

the baseband signal can be expressed as:

$S_{BB}(t) = S_1(t) \pm j S_2(t)$, and the auto-correlation function of the baseband signal is $R(\tau) = A_1^2 R_1(\tau) + A_2^2 R_2(\tau)$.

As can be seen, when the phase difference θ is $$\pm \frac{\pi}{2},$$

no inter-modulation component is included in the auto-correlation function of the baseband signal. In this regard, different data messages are allowed to be modulated on the two signal components, so as to increase the information quantity to be transmitted by the signal.

Figure 2:
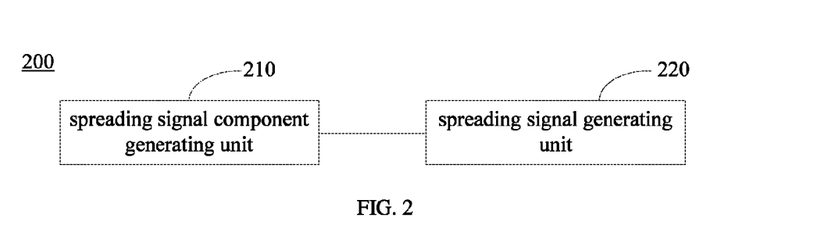
FIG. 2 illustrates a schematic block diagram of a spreading signal generating device according to an embodiment of the present application.

FIG. 2 illustrates a schematic block diagram of a spreading signal generating device according to an embodiment of the present application. As shown, a spreading signal generating device 200 comprises a spreading signal component generating unit 210 and a spreading signal generating unit 220.

The spreading signal component generating unit 210 generates the first spreading signal component and the second spreading signal component, wherein the first spreading signal component and the second spreading signal component each comprise a spreading code and a binary subcarrier. The spreading code of the first spreading signal component is the same as the spreading code of the second spreading signal component, the binary subcarrier of the first spreading signal component is different from the binary subcarrier of the second spreading signal component.

The spreading signal generating unit 220 modulates the first spreading signal component and the second spreading signal component with RF carriers so as to generate a spreading signal, wherein a phase of RF carrier for modulating the first spreading signal component is different from a phase of RF carrier for modulating the second spreading signal component.

According to an embodiment, a spreading signal generating unit 220 generates a spreading signal $S_{RF}$ with the following equations:

$S_{RF} = S_1 \cdot \cos(\omega_{RF} t) + S_2 \cdot \cos(\omega_{RF} t + \theta)$, where $S_1 = A_1 \cdot c(t) \cdot q_1(t) \cdot d(t)$, and $S_2 = A_2 \cdot c(t) \cdot q_2(t) \cdot d(t)$, wherein $S_1$ and $S_2$ stand for the first spreading signal component and the second spreading signal component respectively, $A_1$ and $A_2$ stand for an amplitude of $S_1$ and an amplitude of $S_2$ respectively, c(t) stands for the spreading code of $S_1$ and $S_2$, $q_1(t)$ and $q_2(t)$ stand for the binary subcarrier of $S_1$ and the binary subcarrier of $S_2$ respectively, d(t) stands for a data message, $\omega_{RF}$ stands for an angular frequency of RF carrier, and θ stands for a phase difference between the phase of RF carrier for modulating $S_1$ and the phase of RF carrier for modulating $S_2$.

Figure 3:
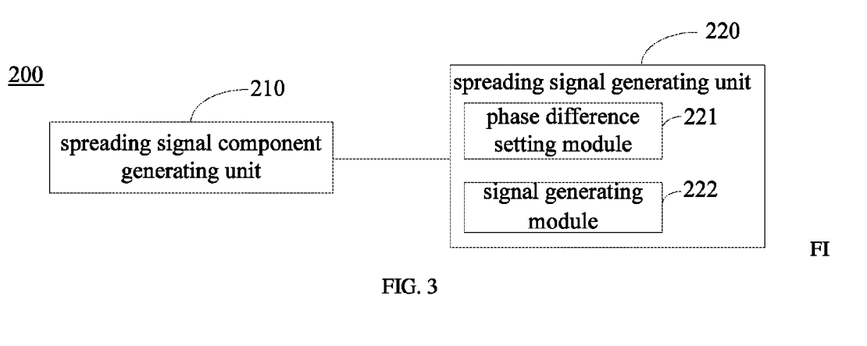
FIG. 3 illustrates a schematic block diagram of a spreading signal generating device according to another embodiment of the present application.

FIG. 3 illustrates a schematic block diagram of a spreading signal generating device according to another embodiment of the present application. As shown, a spreading signal generating unit 220 of a spreading signal generating device 200 can further comprise a phase difference setting module 221 and a signal generating module 222. The phase difference setting module 221 sets said phase difference between the phase of RF carrier for modulating the first spreading signal component $S_1$ and the phase of RF carrier for modulating the second spreading signal component $S_2$, so as to adjust the inter-modulation component between the first spreading signal component $S_1$ and the second spreading signal component $S_2$. The signal generating module 222 generates the spreading signal $S_{RF}$ based on the phase difference θ set by the phase difference setting module 221. For example, based on the phase difference θ set by the phase difference setting module 221, the signal generating module 222 generates the spreading signal $S_{RF}$ with the following equations:

$S_{RF} = S_1 \cdot \cos(\omega_{RF} t) + S_2 \cdot \cos(\omega_{RF} t + \theta)$, where $S_1 = A_1 \cdot c(t) \cdot q_1(t) \cdot d(t)$, and $S_2 = A_2 \cdot c(t) \cdot q_2(t) \cdot d(t)$, wherein $S_1$ and $S_2$ stand for the first spreading signal component and the second spreading signal component respectively, $A_1$ and $A_2$ stand for an amplitude of $S_1$ and an amplitude of $S_2$ respectively, c(t) stands for the spreading code of $S_1$ and $S_2$, $q_1(t)$ and $q_2(t)$ stand for the binary subcarrier of $S_1$ and the binary subcarrier of $S_2$ respectively, d(t) stands for a data message, $\omega_{RF}$ stands for an angular frequency of RF carrier, and θ stands for a phase difference between the phase of RF carrier for modulating $S_1$ and the phase of RF carrier for modulating $S_2$.

According to an embodiment, a phase difference setting module 221 determines the value of the phase difference θ based on a demodulation performance index and a tracking performance index as required at the receiving of the spreading signal.

According to an embodiment, a phase difference setting module 221 can set the RF carrier phase difference θ between the first spreading signal component $S_1$ and the second spreading signal component $S_2$ as $$\pm \frac{\pi}{2},$$

so as to adjust the inter-modulation component between the first spreading signal component $S_1$ and the second spreading signal component $S_2$ as being zero. In addition, the phase difference setting module 221 may set the phase difference θ to be any value and thereby cos θ can be of any value between −1 and +1, such that the amount of the inter-modulation component between the first spreading signal component $S_1$ and the second spreading signal component $S_2$ can be changed.

The embodiments of the present application described as above are mainly involved with the transmission side, that is, with spreading signal generating methods and generating devices. In addition, embodiments of the present application also relate to signals generated through such spreading signal generating methods and by generating devices as those described above.

Moreover, as can be appreciated by those skilled in the art, converse systems, methods, and devices can be applied so as to receive and process spreading signals generated in the embodiments of the present application. Therefore, the embodiments of the present application also relate to systems, methods, and devices for processing, for example, spreading signals as described above.

Figure 4:
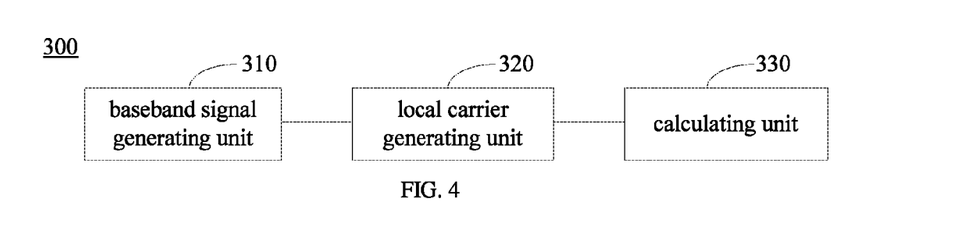
FIG. 4 illustrates a schematic block diagram of a spreading signal receiver according to an embodiment of the present application.

FIG. 4 illustrates a schematic block diagram of a spreading signal receiver according to an embodiment of the present application. As shown, a receiver 300 comprises a baseband signal generating unit 310, a local carrier generating unit 320, and a calculating unit 330. The receiver 300 can be used to process a spreading signal $S_{RF}$ received.

The baseband signal generating unit 310 generates a local replica $\hat{c}(t)$ of spreading code of the spreading signal $S_{RF}$, a local replica $\hat{q}_1(t)$ of binary subcarrier of a first spreading signal component and a local replica $\hat{q}_2(t)$ of binary subcarrier of a second spreading signal component.

The local carrier generating unit 320 generates a local carrier based on a phase difference θ between a phase of RF carrier for modulating the first spreading signal component and a phase of RF carrier for modulating the second spreading signal component.

Based on the local carrier generated by the local carrier generating unit 320, as well as the local replica $\hat{c}(t)$ of spreading code, the local replica $\hat{q}_1(t)$ of binary subcarrier of the first spreading signal component and the local replica $\hat{q}_2(t)$ of binary subcarrier of the second spreading signal component generated by the baseband signal generating unit 310, the calculating unit 330 calculates a coherent integration for the spreading signal $S_{RF}$ received, and also calculates a linear combination of results of the integration, so as to obtain an integrated in-phase channel component I and an integrated quadrature-phase channel component Q.

Figure 5:
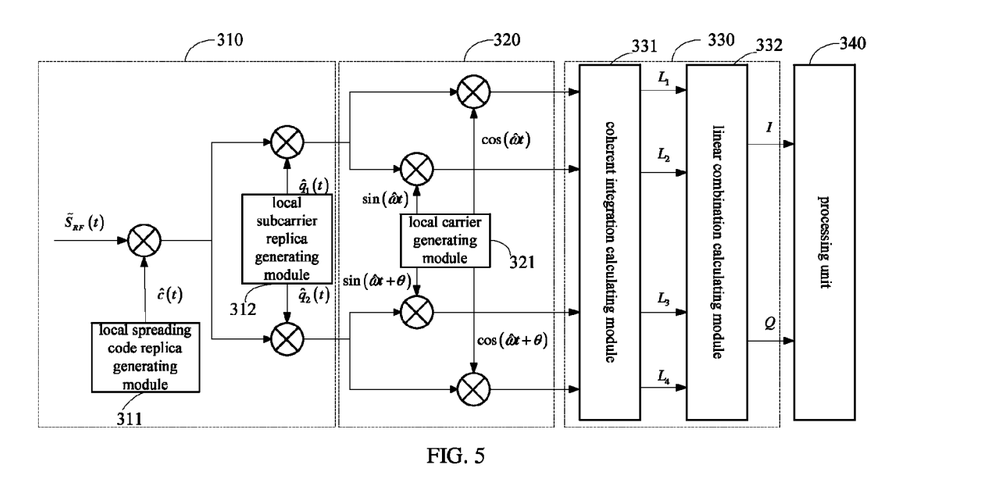
FIG. 5 illustrates a schematic diagram of an implementation of a spreading signal receiver according to an embodiment of the present application.

FIG. 5 illustrates a schematic diagram of an implementation of a spreading signal receiver according to an embodiment of the present application.

As shown in FIG. 5, a baseband signal generating unit 310 further comprises a local spreading code replica generating module 311 and a local subcarrier replica generating module 312. The local spreading code replica generating module 311 generates a local replica $\hat{c}(t)$ of spreading code of a spreading signal $S_{RF}$. The local subcarrier replica generating module 312 generates a local replica $\hat{q}_1(t)$ of binary subcarrier of a first spreading signal component and a local replica $\hat{q}_2(t)$ of binary subcarrier of a second spreading signal component.

The local carrier generating unit 320 further comprises a local carrier generating module 321. Based on a phase difference θ between a phase of RF carrier for modulating the first spreading signal component and a phase of RF carrier for modulating the second spreading signal component, the local carrier generating module 321 generates local carriers cos($\hat{\omega}t$), sin($\hat{\omega}t$), cos($\hat{\omega}t+\theta$), sin($\hat{\omega}t+\theta$), wherein $\hat{\omega}$ stands for a demodulation angular frequency of local carrier. As can be appreciated, if a spreading signal received is demodulated immediately, then $\hat{\omega}=\omega_{RF}$; if a spreading signal is demodulated after a carrier of the spreading signal is converted to an intermediate frequency via a down-converter, then $\hat{\omega} \leq \omega_{RF}$, where $\hat{\omega}$ is the carrier intermediate frequency via the down-converter.

The calculating unit 330 further comprises a coherent integration calculating module 331 and a linear combination calculating module 332.

The coherent integration calculating module 331 calculates a coherent integration for the spreading signal $S_{RF}$ received based on the local carriers cos($\hat{\omega}t$), sin($\hat{\omega}t$), cos($\hat{\omega}t+\theta$), sin($\hat{\omega}t+\theta$) generated by the local carrier generating unit 320, and on the local replica $\hat{c}(t)$ of spreading code, the local replica $\hat{q}_1(t)$ of binary subcarrier of the first spreading signal component and the local replica $\hat{q}_2(t)$ of binary subcarrier of the second spreading signal component generated by the baseband signal generating unit 310. The coherent integration calculation can be expressed specifically as:

$$L_1 = \int_{t_1}^{t_1+T_{coh}} \tilde{S}_{RF}(t)\hat{c}(t)\hat{q}_1(t)\cos(\hat{\omega}t)dt$$

$$L_2 = \int_{t_1}^{t_1+T_{coh}} \tilde{S}_{RF}(t)\hat{c}(t)\hat{q}_1(t)\sin(\hat{\omega}t)dt$$

$$L_3 = \int_{t_1}^{t_1+T_{coh}} \tilde{S}_{RF}(t)\hat{c}(t)\hat{q}_2(t)\cos(\hat{\omega}t+\theta)dt$$

$$L_4 = \int_{t_1}^{t_1+T_{coh}} \tilde{S}_{RF}(t)\hat{c}(t)\hat{q}_2(t)\sin(\hat{\omega}t+\theta)dt$$

where $\tilde{S}_{RF}(t)$ stands for the spreading signal received, $\hat{c}(t)$ stands for the local replica of spreading code, $\hat{q}_1(t)$ and $\hat{q}_2(t)$ stand for the local replica of binary subcarrier of the first spreading signal component and the local replica of binary subcarrier of the second spreading signal component respectively, $\hat{\omega}$ stands for an angular frequency of local carrier; $t_1$ is a starting time for coherent integration, $T_{coh}$ is a duration for integration; $\tilde{A}_1$ and $\tilde{A}_2$ are a first weighting coefficient and a second weighting coefficient respectively, where $\tilde{A}_1:\tilde{A}_2 = A_1:A_2$; $L_1, L_2, L_3, L_4$ are results of the coherent integration; and I and Q are an integrated in-phase channel component and an integrated quadrature-phase channel component respectively.

The linear combination calculating module 332 calculates a linear combination of results calculated by the coherent integration calculating module 331, so as to obtain an integrated in-phase channel component I and an integrated quadrature-phase channel component Q, specifically, with:

$$I = \tilde{A}_1 L_1 + \tilde{A}_2 L_3$$

$$Q = -\tilde{A}_1 L_2 - \tilde{A}_2 L_4$$

where $\tilde{A}_1$ and $\tilde{A}_2$ are the first weighting coefficient and the second weighting coefficient respectively, a ratio between which equals to a ratio between an amplitude $A_1$ of spreading signal component $S_1$ and an amplitude $A_2$ of spreading signal component $S_2$ at the generation of the spreading signal, that is, $\tilde{A}_1:\tilde{A}_2 = A_1:A_2$.

According to an embodiment of the present application, as shown in FIG. 5, a receiver 300 may further comprise a processing unit 340, which carries out the carrier synchronization, code timing synchronization, data demodulation, measurement of the ranging code phase and carrier phase based on the integrated in-phase channel component and the integrated quadrature-phase channel component obtained. As can be appreciated by those skilled in the art, after the integrated in-phase channel component I and the integrated quadrature-phase channel component Q are obtained in the receiver, functions such as the carrier synchronization, code timing synchronization, data demodulation, measurement of the ranging code phase and carrier phase and so on carried out by the processing unit are in a manner similar to those in the prior art, details of which hence will not be described herein.

Figure 6:
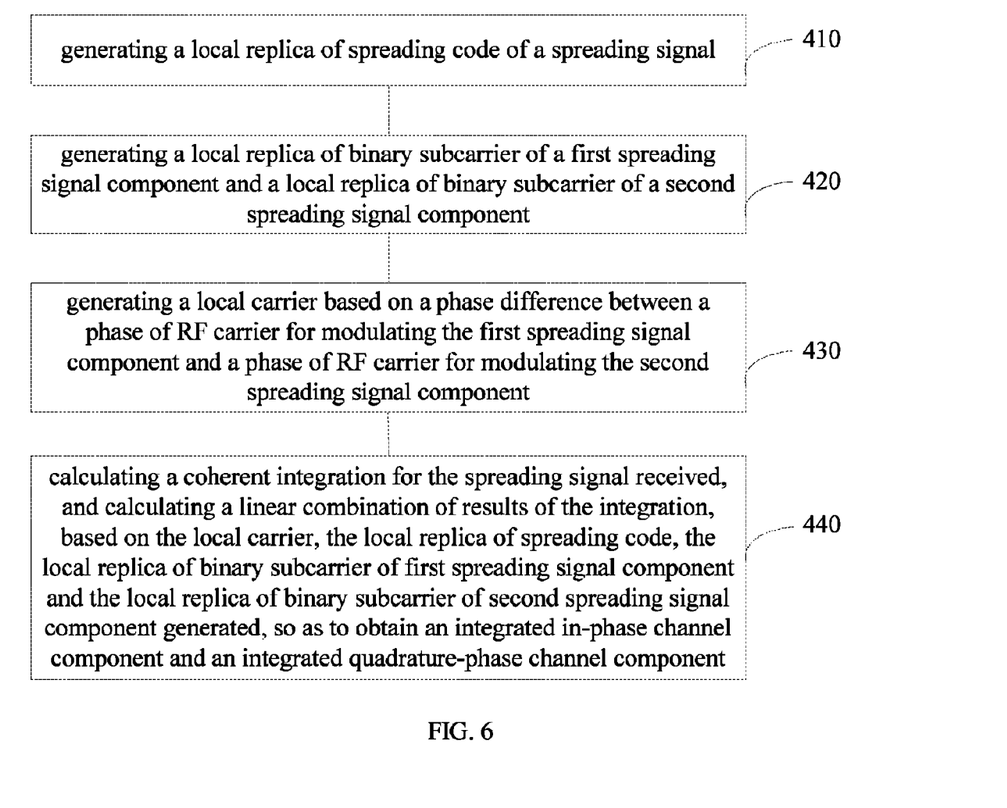
FIG. 6 illustrates a flowchart of a spreading signal receiving method according to an embodiment of the present application.

FIG. 6 illustrates a flowchart of a spreading signal receiving method according to an embodiment of the present application. As shown, in Step 410, a local replica of spreading code of a spreading signal is generated.

In Step 420, a local replica of binary subcarrier of a first spreading signal component and a local replica of binary subcarrier of a second spreading signal component are generated.

In Step 430, a local carrier is generated based on a phase difference between a phase of RF carrier for modulating the first spreading signal component and a phase of RF carrier for modulating the second spreading signal component.

In Step 440, the coherent integration for the spreading signal received and the linear combination of results of the integration are calculated, based on the local carrier, the local replica of spreading code, the local replica of binary subcarrier of the first spreading signal component and the local replica of binary subcarrier of the second spreading signal component generated, so as to obtain an integrated in-phase channel component and an integrated quadrature-phase channel component.

According to an embodiment of the present application, the coherent integration can be calculated in Step 440 with the following equations:

$$L_1 = \int_{t_1}^{t_1+T_{coh}} \tilde{S}_{RF}(t)\hat{c}(t)\hat{q}_1(t)\cos(\hat{\omega}t)dt$$

$$L_2 = \int_{t_1}^{t_1+T_{coh}} \tilde{S}_{RF}(t)\hat{c}(t)\hat{q}_1(t)\sin(\hat{\omega}t)dt$$

$$L_3 = \int_{t_1}^{t_1+T_{coh}} \tilde{S}_{RF}(t)\hat{c}(t)\hat{q}_2(t)\cos(\hat{\omega}t+\theta)dt,$$

$$L_4 = \int_{t_1}^{t_1+T_{coh}} \tilde{S}_{RF}(t)\hat{c}(t)\hat{q}_2(t)\sin(\hat{\omega}t+\theta)dt$$

and the linear combination can be calculated with the following equations:

$$I = \hat{A}_1 L_1 + \hat{A}_2 L_3,$$

$$Q = -\hat{A}_1 L_2 - \hat{A}_2 L_4$$

where $\tilde{S}_{RF}(t)$ is a spreading signal received, $\hat{c}(t)$ is a local replica of spreading code, $\hat{q}_1(t)$ and $\hat{q}_2(t)$ are a local replica of binary subcarrier of a first spreading signal component and a local replica of binary subcarrier of a second spreading signal component respectively, $\hat{\omega}$ is an angular frequency of local carrier; $t_1$ is a starting time for coherent integration, $T_{coh}$ is a duration for integration; $\tilde{A}_1$ and $\tilde{A}_2$ are a first weighting coefficient and a second weighting coefficient respectively, where $\tilde{A}_1 : \tilde{A}_2 = A_1 : A_2$; $L_1, L_2, L_3, L_4$ stand for results of the coherent integration; and I and Q are an integrated in-phase channel component and an integrated quadrature-phase channel component respectively.

According to an embodiment of the present application, a spreading signal receiving method can further comprise: carrying out the carrier synchronization, code timing synchronization, data demodulation, measurement of the ranging code phase and carrier phase, based on the integrated in-phase channel component and the integrated quadrature-phase channel component obtained. As can be appreciated, those skilled in the art can employ various manners in the prior art for carrying out the carrier synchronization, code timing synchronization, data demodulation, measurement of the ranging code phase and carrier phase, based on the integrated in-phase channel component and the integrated quadrature-phase channel component.

Embodiments of the present application can be implemented in the form of hardware, software or the combination thereof. According to an aspect of the present application, a program is provided comprising executable instructions to implement the spreading signal generating method, generating device, spreading signal receiving method, receiving device according to embodiments of the present application. In addition, the program can be stored in a storage of any form, such as optical or magnetic readable media, chip, ROM, PROM, or volatile or non-volatile memory device. According to an example of an embodiment of the present application, a machine-readable storage is provided for storing the program.

While various embodiments of the present application have been described above referring to the drawings, it should be understood that they have been presented by way of example only, and not limitation. It will be apparent to those skilled in the art that various changes in form and detail can be made therein without departing from the spirit and scope of the invention.

What is claimed is:

1. A spreading signal generating method, comprising:
using a spreading signal component generating circuit to generate a first spreading signal component and a second spreading signal component, wherein the first spreading signal component and the second spreading signal component each includes a spreading code and a binary subcarrier, wherein the spreading code of the first spreading signal component is the same as the spreading code of the second spreading signal component, and the binary subcarrier of the first spreading signal component is different from the binary subcarrier of the second spreading signal component;
modulating the first spreading signal component with a first RF carrier and the second spreading signal component with a second RF carrier so as to generate a unified spreading signal, wherein a phase of the first RF carrier is different from a phase of the second RF carrier, wherein a phase difference between the phase of the first RF carrier and the phase of the second RF carrier is set to adjust an inter-modulation component between the first spreading signal component and the second spreading signal component; and
wherein the unified spreading signal generated is:

$$S_{RF} = S_1 \cdot \cos(\omega_{RF}t) + S_2 \cdot \cos(\omega_{RF}t+\theta)$$

$$S_1 = A_1 \cdot c(t) \cdot q_1(t) \cdot d(t)$$

$$S_2 = A_2 \cdot c(t) \cdot q_2(t) \cdot d(t),$$

where $S_{RF}$ stands for the spreading signal, $S_1$ and $S_2$ stand for the first spreading signal component and the second spreading signal component respectively, $A_1$ and $A_2$ stand for an amplitude of $S_1$ and an amplitude of $S_2$ respectively, c(t) stands for the spreading code of $S_1$ and $S_2$, $q_1(t)$ and $q_2(t)$ stand for the binary subcarrier of $S_1$ and the binary subcarrier of $S_2$ respectively, d(t) stands for a data message, $\omega_{RF}$ stands for an angular frequency of RF carrier, and $\theta$ stands for a phase difference between the phase of the first RF carrier and the phase of the second RF carrier.

2. The method as claimed in claim 1, wherein the binary subcarrier is a binary coded symbol BCS subcarrier.

3. The method as claimed in claim 2, the method further comprising:
setting the phase difference $\theta$ as $$\pm \frac{\pi}{2}$$

so as to adjust the inter-modulation component between the first spreading signal component $S_1$ and the second spreading signal component $S_2$ as being zero.

4. The method as claimed in claim 1, wherein the binary subcarrier is a binary offset carrier BOC subcarrier.

5. The method as claimed in claim 4, the method further comprising:
setting the phase difference θ as $$\pm \frac{\pi}{2}$$

so as to adjust the intern-modulation component between the first spreading signal component $S_1$ and the second spreading signal component $S_2$ as being zero.

6. The method as claimed in claim 1, further comprising:
determining the value of the phase difference θ based on a demodulation performance index and a tracking performance index as required at the receiving of the spreading signal.

7. The method as claimed in claim 6, further comprising:
setting the phase difference θ as $$\pm \frac{\pi}{2}$$

so as to adjust the inter-modulation component between the first spreading signal component $S_1$ and the second spreading signal component $S_2$ as being zero.

8. A method for receiving a spreading signal, the method comprising:
generating a local replica of a spreading code of a spreading signal;
generating a local replica of a binary subcarrier of a first spreading signal component and a local replica of a binary subcarrier of a second spreading signal component;
generating a local carrier based on the phase difference between a phase of an RF carrier for modulating the first spreading signal component and a phase of an RF carrier for modulating the second spreading signal component;
calculating a coherent integration for the spreading signal received and calculating a linear combination of results of the integration, based on the local carrier, the local replica of spreading code, the local replica of binary subcarrier of the first spreading signal component and the local replica of binary subcarrier of the second spreading signal component generated, so as to obtain an integrated in-phase channel component and an integrated quadrature-phase channel component; and wherein the coherent integration is calculated with the following equations:

$$L_1 = \int_{t_1}^{t_1+T_{coh}} \tilde{S}_{RF}(t)\hat{c}(t)\hat{q}_1(t)\cos(\hat{\omega}t)dt$$

$$L_2 = \int_{t_1}^{t_1+T_{coh}} \tilde{S}_{RF}(t)\hat{c}(t)\hat{q}_1(t)\sin(\hat{\omega}t)dt$$

$$L_3 = \int_{t_1}^{t_1+T_{coh}} \tilde{S}_{RF}(t)\hat{c}(t)\hat{q}_2(t)\cos(\hat{\omega}t+\theta)dt$$

$$L_4 = \int_{t_1}^{t_1+T_{coh}} \tilde{S}_{RF}(t)\hat{c}(t)\hat{q}_2(t)\sin(\hat{\omega}t+\theta)dt,$$

and the linear combination is calculated with the following equations:

$$I = \hat{A}_1 L_1 + \hat{A}_2 L_3$$

$$Q = -\hat{A}_1 L_2 - \hat{A}_2 L_4,$$

where $\tilde{S}_{RF}(t)$ stands for the spreading signal received, $\hat{c}(t)$ is the local replica of spreading code, $\hat{q}_1(t)$ and $\hat{q}_2(t)$ are the local replica of binary subcarrier of the first spreading signal component and the local replica of binary subcarrier of the second spreading signal component respectively, $\hat{\omega}$ is an angular frequency of local carrier; $t_1$ is a starting time for coherent integration, $T_{coh}$ is a duration for integration; $\tilde{A}_1$ and $\tilde{A}_2$ are a first weighting coefficient and a second weighting coefficient respectively, where $\tilde{A}_1 : \tilde{A}_2 = A_1 : A_2$; $L_1, L_2, L_3, L_4$ are results of the coherent integration; and I and Q are the integrated in-phase channel component and the integrated quadrature-phase channel component respectively.

9. The method as claimed in claim 8, further comprising:
carrying out the carrier synchronization, code timing synchronization, data demodulation, measurement of the ranging code phase and carrier phase, based on the integrated in-phase channel component and the integrated quadrature-phase channel component obtained.

* * * * *